United States Patent [19]
Ault et al.

[11] Patent Number: 5,987,495
[45] Date of Patent: Nov. 16, 1999

[54] METHOD AND APPARATUS FOR FULLY RESTORING A PROGRAM CONTEXT FOLLOWING AN INTERRUPT

[75] Inventors: Donald F. Ault, Hyde Park; Kenneth E. Plambeck; Casper A. Scalzi, both of Poughkeepsie, all of N.Y.

[73] Assignee: International Business Machines Corporation, Armonk, N.Y.

[21] Appl. No.: 08/966,374

[22] Filed: Nov. 7, 1997

[51] Int. Cl.$^6$ .................................................. G06F 9/46
[52] U.S. Cl. .......................................... 709/108; 710/260
[58] Field of Search ................................... 709/108, 300; 710/260, 261, 267; 712/208, 233; 711/200

[56] References Cited

U.S. PATENT DOCUMENTS

| | | | |
|---|---|---|---|
| 4,912,628 | 3/1990 | Briggs ........................................ | 364/200 |
| 5,155,853 | 10/1992 | Mitsuhira et al. ....................... | 395/734 |
| 5,161,226 | 11/1992 | Wainer ..................................... | 395/650 |
| 5,375,230 | 12/1994 | Fujimori ................................. | 395/575 |
| 5,390,329 | 2/1995 | Gaertner et al. ......................... | 395/650 |
| 5,390,332 | 2/1995 | Golson .................................... | 395/725 |
| 5,428,779 | 6/1995 | Allegrucci et al. ...................... | 395/650 |
| 5,515,538 | 5/1996 | Kleiman .................................. | 395/733 |
| 5,761,492 | 6/1998 | Fernando et al. ........................ | 395/591 |
| 5,790,872 | 8/1998 | Nozue et al. ............................ | 395/740 |

FOREIGN PATENT DOCUMENTS

WO9608948  3/1996  European Pat. Off. .

OTHER PUBLICATIONS

IBM Technical Disclosure Bulletin, vol. 32, No. 6B—Nov. 1989 "Deterministic Context Switching of Registers" pp. 70–73.

IBM Technical Disclosure Bulletin, vol. 33, No. 3B, Aug. 1990 "Technique To Improve Context . . . In a CPU", pp. 472–473.

Enterprise Systems Architecture/390 Manual—Principles of Operation SA22–7201–02.

*Primary Examiner*—Gopal C. Ray
*Attorney, Agent, or Firm*—William A. Kinnaman, Jr.

[57] ABSTRACT

A method and apparatus for fully restoring the context of a user program, including program status word (PSW) and CPU register contents, following an asynchronous interrupt. Upon the occurrence of an asynchronous interrupt event, control is transferred from the normally executing part of the user program to an interrupt handler of the operating system kernel. The kernel interrupt handler saves the contents of the CPU registers and PSW as they existed at the time of the interrupt in a save area associated with the user program before transferring control to a signal catcher routine of the user program. When it has finished handling the interrupt, the signal catcher routine restores the previous state of program execution as it existed before the interrupt by storing the address of the save area in a selected register (which may be a general register/access register pair), restoring the contents of the registers other than the selected register containing the address of the save area, and then restoring the contents of the PSW and selected register by using a new Resume Program (RP) instruction. The RP instruction contains an operand field specifying through the selected register the base address of the save area together with offset fields specifying the offsets of the saved contents of the PSW and selected register relative to the beginning of the save area. Upon decoding an RP instruction, the CPU executing the instruction adds the displacement to the base address contained in the specified register to form the beginning address of the save area, to which it adds the specified offsets to access the saved PSW and selected register contents. The current PSW and selected register contents are then restored with the saved contents to fully restore the previous program context and return control to the instruction being executed at the point of interrupt. To ensure system integrity, only those fields of the PSW are restored that could have otherwise been restored by a program operating in problem state.

23 Claims, 6 Drawing Sheets

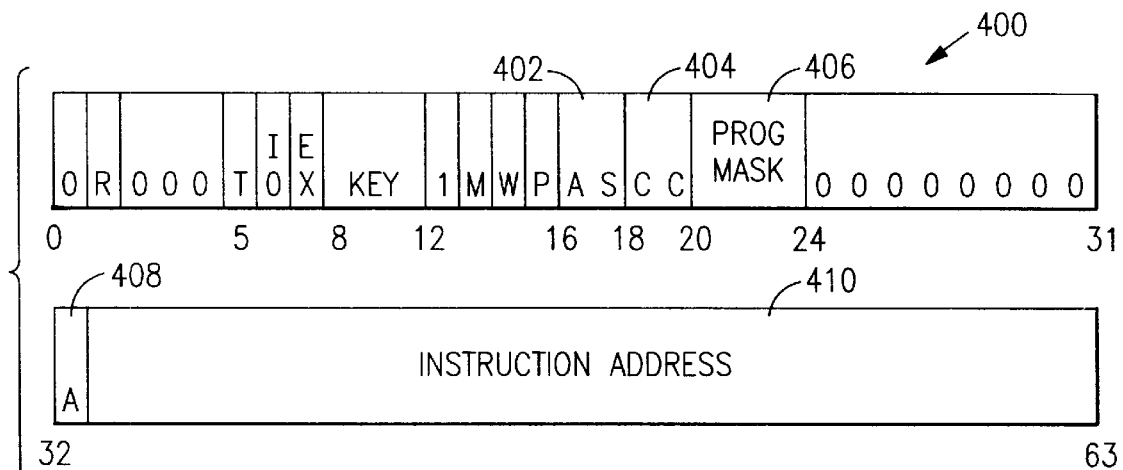
FIG.4
FIG.5
| PSW BITS | FIELD NAME |
|---|---|
| 16 AND 17 | ADDRESS-SPACE CONTROL (AS) |
| 18 AND 19 | CONDITION CODE (CC) |
| 20-23 | PROGRAM MASK |
| 32 | ADDRESSING MODE (A) |
| 33-63 | INSTRUCTION ADDRESS |
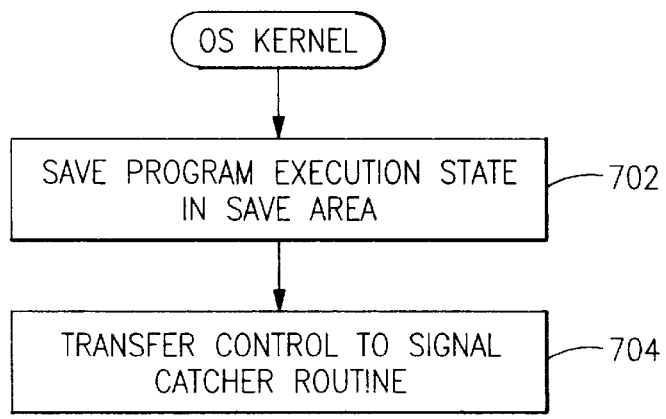
FIG.7

METHOD AND APPARATUS FOR FULLY RESTORING A PROGRAM CONTEXT FOLLOWING AN INTERRUPT

BACKGROUND OF THE INVENTION

1. Field of the Invention

This invention relates to a method and apparatus for fully restoring a program context following an interrupt and, more particularly, to a method and apparatus for restoring the contents of the CPU registers and program status word (PSW) as they existed prior to the asynchronous interrupt of a user program executing in problem state.

2. Description of the Related Art

In a modern computing environment, an operating system is a program (or set of programs) that manages the facilities of a computing system such that the system can be shared among many disparate users being served by multiple independent programs running under the control of that operating system. Hardware resources are under the control of the operating system, which allocates these to the various programs under its control as they request an allocation of them. Thus, real storage space, virtual addressing capability, auxiliary storage space, and ports to the outside world are shared by the programs under the auspices and control of the operating system.

To enforce its management and control over system resources and to provide sharing of facilities with system integrity maintained, the architecture of a system provides mechanisms useful for fencing the operating system from the programs it serves and controls and for fencing those programs from each other. One of these is the operating authority state. Generally, at least two operating states are provided, often called supervisor state and problem state. The supervisor state allows system-wide access authority without fencing, and allows the operating system which uses it to allocate and control which programs have access to which parts of which facilities at which time.

The problem state provides the logical and arithmetic capabilities necessary to solve the problems of a broad range of application programs, and to allow middleware, e.g., database managers or communication access methods, to provide the services to other programs as expected of such middleware. But, in problem state a program is restricted in its accessing capability to that fenced for it by the operating system using the access control mechanisms of the system architecture. These mechanisms are designed to prevent unauthorized access to the operating domain of any other program. Except for performance, and for operating system interfaces expressly provided for intercommunication among programs, the separate programs should not be affected by sharing the system with other programs, and should not be aware of the existence of the other programs. Because of the prevalence of programming error, caused by the complexity of some programming, middleware generally operates in problem state for most of its operating time in order to isolate each such program from the others, in order to minimize the effect of the occasional error, ease detection of the cause of such errors, and improve the recoverability of the system when such errors occur. Further, application programs must be authorized only to those system aspects that affect their own execution. This is particularly true in a world in which computer viruses are seen, and in which, though infrequent, other cases of programming malice are experienced.

Although the present invention may be used in other architectures, it will be discussed in the setting of the IBM® S/390® architecture as documented, for example, in the IBM publication *Enterprise Systems Architecture/390 Principles of Operation*, SA22-7201-02, 1994, and successor versions thereof, incorporated herein by reference.

One of the key mechanisms in an S/390 system is the program status word (PSW), which directs the processor in the execution of a program. It indicates the next instruction to be executed and contains controls constraining the operating state and authority of the program executing under that PSW. Another mechanism is virtual addressing, where the operating system supplies the real backing storage for the virtual storage accessed by problem state programs. Another control mechanism is the set of control words that determine new PSW content on events that must be handled asynchronously by the operating system. For example, when the processor wishes to present a signal that an input/output (I/O) operation has completed and the device or control unit wishes to make a report of the event, this area will indicate the instruction location of the first instruction of the routine that handles the event. The operating system must handle this external event since the I/O devices as a group are shared with different programs allowed access to different ones. The operating system must reflect the completion, in accordance with its own protocols, to programs requiring notification. The PSW content established on the occurrence of an event to be handled by a part of the operating system generally puts the system into the supervisor state, but the interrupted state is saved for later reestablishment when the interrupted program is later to be resumed. Most of the time, the interrupted program was one executing in problem state and restoring state will return the processor to that state. Because the PSW is used to constrain the capability of the program executing on a processor, loading the PSW is restricted to programs executing in supervisor state. One obvious reason is that, depending on the setting of its problem state bit, the PSW authorizes supervisor state or restricts the executing program to problem state with its access and operational restrictions. The restrictions imposed on a problem state program would be of little consequence if the program could simply upgrade its state to supervisor state by overwriting the problem state bit in the PSW.

There are sound technical reasons for allowing a complex program, running in a system with an operating system, to itself contain asynchronous processes associated with asynchronous events for which the program provides special event processing, but to execute in problem program authority state nonetheless, for system integrity reasons. One example occurs in UNIX® programs in which one program may send a message or signal to another program, with the signal arrival occurring asynchronously to the normal processing of the program which is to receive the signal. The kernel program interrupts the normal flow of the program to which it is to deliver the signal and transfers control to a different part of the program designed and coded to handle the asynchronous arrival of the signal. We can call this part of the program its signal catcher routine. The problem posed is that of an efficient return to the normal operating part of the program at its point of interruption after the signal handling part of the program has completed its processing of the signal event. When the operating system kernel handles a logical interruption to an executing program, it has saved the operating state of that program, allowing later resumption of the program, as if the interruption never occurred. In an S/390 system, this involves saving all general purpose resisters (GRs), access registers (ARs), the content of the PSW at the point of interruption, including both the instruction address of the point of interruption and the state variables controlling the execution of the program. The PSW also records the current setting of the condition code, which reflects the kind of result obtained in the last arithmetic or logical operation, or special circumstances arising in other types of instruction. The program mask, indicating how the processor should behave when certain program exceptions occur during the performance of certain instruction types is also part of the PSW, and actions by the program, which do not require any special authority, can change bits in this field. These are set by the program in concert with its own structure, and each program may have a different program mask and may change it from time to time without communication with the operating system, in order to change the handling of an exception condition. The PSW also specifies the addressing mode, i.e., whether the processor should produce 24-bit addresses or 31-bit addresses when forming effective addresses. This can be changed freely as part of certain branch instructions, so the mode may be either value at any time, and must be restored to that value after an interruption if the program is to operate correctly. The PSW also indicates whether a problem state program is in primary space mode or access register mode at any point in its execution, and this must be properly restored if the program is to execute correctly. Since a problem state instruction can be used to switch between the two addressing modes, the program may be in either mode at any time, unpredictably, and after an interruption, the correct value must be restored.

In the S/390 operational environment, the UNIX kernel itself operates as part of the operating system, and has saved the status of the interrupted program at the point of its interruption. The save area contains the PSW contents as well as the general registers (GRs) and access registers (ARs). Since this save area is provided to allow what is essentially an emulation of an interruption within a single problem state program, it will be preserved should the signal handling part of the program be itself interrupted after it has been entered to handle the signal received. The operating system will use another save area should an interruption occur while the signal handling routine is executing. The save area to be used in returning from the signal handling part of the program to its interrupted part is preserved in storage for that process, in an area accessible by the program itself with its normal storage access authority.

In an S/390 system, which uses the general registers for specifying the addresses of storage operands, it is impossible for a problem state program to transfer control directly to another program using a normal branch instruction and, at the same time, restore all the general registers to some saved earlier value. That is because the save area address is specified by the contents of a general register/access register (GR/AR) register pair, and these values were not the content of the registers at the earlier time of saving the register contents, in the most general case. Also, the branch address must be specified in another general register whose content would generally have been different at the time of saving the registers. Also, it is impossible to properly reflect the control fields of the PSW as they were at the time of the interruption without the use of a Load PSW instruction, which requires the issuing program to be in supervisor state. This is particularly true of the condition code field in the PSW.

The problem has been solved within the operating system since it must perform such actions routinely in dispatching programs. It does this by the use of a PSW in low storage which can be accessed without use of a GR, after disabling the system's interruption capability so that it can not be interrupted in the middle of restoring the execution state of an interrupted program. It would be possible for an operating system service to be defined that would perform the restoration of control back to the interrupted part of the program that the signal catcher is part of, but this would require transition from problem state to supervisor state, and establishment of the PSW to be restored in the low storage area of the computing system, and use of the Load PSW instruction, with the performance negatives of such an instruction path.

What is desired instead is a processor mechanism that provides a direct resumption of an earlier interrupted program without disabling the processor from hardware interruption handling, and without requiring the program to be in an authorized state to cause the resumption from the logical interruption, and without causing a transition to an authorized state to have it done by an authorized system service. It is estimated that such a mechanism would save hundreds, and perhaps even thousands, of executed instructions in doing the program control restoration to the program at the point at which it was logically interrupted for the signal delivery.

SUMMARY OF THE INVENTION

As a preliminary to describing the invention itself, the insights that led to it will be discussed. Problem state programs generally have the least authority among the agencies of the computing system. Only a subset of the architected facilities are available to it. The defined architecture of the system provides the operating system with a set of architected facilities which it may use, and in some cases allocate to problem state programs. Some of those that are withheld from direct use are made available by means of system services provided by the operating system, particularly where physical resources are shared by different programs, e.g., real main storage, external storage space, networking facilities, etc. In like manner, at a lower level of control, the microcode and hardware agencies of the system have defined facilities for their own use which are not accessible, or even seen at the system architecture level. Examples are a section of storage not accessible to programs in either problem or supervisor state, which storage is required to perform the invocable functions of the architecture, registers reserved for internal use, adders and other logical units needed to do addressing and arithmetic. The microcode in particular must perform its assigned programming tasks without polluting the architected facilities of the system. It operates at a third, separate and isolated, level of control in the system, with capabilities beyond the problem state and the supervisor state. The microcode and hardware of the system are designed and the design verified and tested for correctness before the system is manufactured. Special concern is paid that the hardware and microcode can not be compromised as far as system integrity is concerned by actions performed by programs in either supervisor or problem state. Otherwise, the authority structure of the system architecture can not be guaranteed.

The major point here is that the microcode does not change dynamically, it can be considered to be a manufactured component of the system, and is a fully trusted element in the integrity structure of the system. The microcode has full access to programmable storage, and to the Program Status Word (PSW) of the system as part of its necessary capabilities. The microcode can perform complex operations of many steps in order to provide the functions of what is a single instruction at the architecture level above it. Similarly, below the microcode level of control, the hardware elements of the system must have complete access to all system facilities, even those not readily available to the microcode.

The constraint on them is that they may not allow a higher agency to use the facilities usable at the higher level to compromise the integrity of their own operation.

Therefore, in accordance with the present invention, a new instruction, referred to herein as Resume Program (RP), which is invocable in problem state, and is performed at either the microcode or the hardware level, is defined to perform the transition of control from the interrupt-handling routine back to the point of interruption in the main path of the program by restoring state information saved in a save area. The instruction is defined such that only aspects of the PSW that are changeable by a problem state program by other means can be restored using it. Also, since the condition codes of the programming level PSW are not set by the microcode or hardware levels for their own purposes, and the PSW of the programming level is not used by them, they have no problem in establishing a restored state in the PSW.

The instruction addresses the save area by means of a register, and in S/390, possibly an access register (AR), which general register and access register are to be restored by the RP instruction, after using the save area address they specify for the RP instruction itself. The instruction specifies the offsets within the save area of the saved PSW content, the AR to be restored, and the general register to be restored. Only the specified PSW fields (those changeable within problem state) are restored from the saved PSW to the PSW that is given control when the instruction completes its own execution.

More particularly, in one aspect the present invention contemplates a method and apparatus for operating a processor to restore a previously saved program context in an information handling system in which execution of a program by the processor is controlled by a program status word (PSW) defining a program context, in which the program executes in either a first state having relatively restricted authority or a second state having relatively unrestricted authority, and in which the PSW contains a first set of fields that are alterable by a program executing in the first state and a second set of fields that are not alterable by a program executing in the first state. In accordance with this aspect of the invention, a Resume Program (RP) instruction is defined that specifies a storage location containing a saved PSW. Upon decoding an RP instruction, the processor restores from the saved PSW word contained at the specified storage location only those fields of the current PSW that are alterable by a program executing in the first state.

The saved PSW may contain an instruction address that is restored to cause execution to resume at that address. The RP instruction is intended for execution by a program executing in the first state having relatively restricted authority, hence the restrictions on which fields of the PSW are updated. Preferably, the RP instruction contains a field specifying a register, and the storage location is determined using the contents of the specified register. The field may be a first field, and the RP instruction may contain a second field specifying a displacement from a base address, in which case the storage location is determined by adding the displacement contained in the second field to a base address contained in the register specified by the first field.

The save area may also contain the saved contents of the register itself, which are restored to the register from the save area. The RP instruction may specify a beginning address of the save area and an offset from the beginning address, with the storage location being determined by adding the offset specified by the RP instruction to the beginning address of the save area.

Another aspect of the present invention contemplates a method and apparatus for operating a processor to restore a previously saved program context comprising a PSW and a set of register contents. In accordance with this aspect of the invention, the Resume Program (RP) instruction specifies a register selected from the set of registers that points to a save area containing a saved PSW and saved register contents. In an S/390 environment or other environment using access registers in a similar manner, the specified register may be a general register/access register (GR-AR) pair. In response to decoding an RP instruction, the processor accesses the save area using the contents of the specified register and then restores the PSW and the register from the saved PSW and saved register contents contained in the save area. This causes the processor to resume execution at the instruction address contained in the saved PSW with the program context defined by the saved PSW and saved register contents.

As before, the specified register may specify a base address, and the RP instruction may also specify a displacement that is added to the base address to obtain the address of the save area. Likewise, the RP instruction may specify offsets that are added to the beginning address of the save area to obtain the addresses at which the various saved values (PSW, register contents) are stored.

Yet another aspect of the invention contemplates a method whereby a program may use the RP instruction to restore a previously saved PSW and register contents defining a previous program context. In accordance with this aspect of the invention, the program loads the address of the save area containing said previously saved program context into a specified register (which may be a GR/AR pair), restores the contents of the registers of each register type other than the specified register from the save area using a first instruction (e.g., LM for general registers and LAM for access registers in an S/390 environment), and restores the contents of the PSW and the specified register from the save area using the RP instruction to resume execution at the instruction address contained in the saved PSW with the program context defined by the saved PSW and saved register contents.

BRIEF DESCRIPTION OF THE DRAWINGS

FIG. 4 depicts an S/390 Program Status Word (PSW) used in the described embodiment.

FIG. 5 lists the PSW fields that are restored by the execution of the Resume Program (RP) instruction in an S/390 embodiment.

FIG. 7 shows the steps performed by the interrupt handler of the OS kernel.

DESCRIPTION OF THE PREFERRED EMBODIMENT

Figure 1:
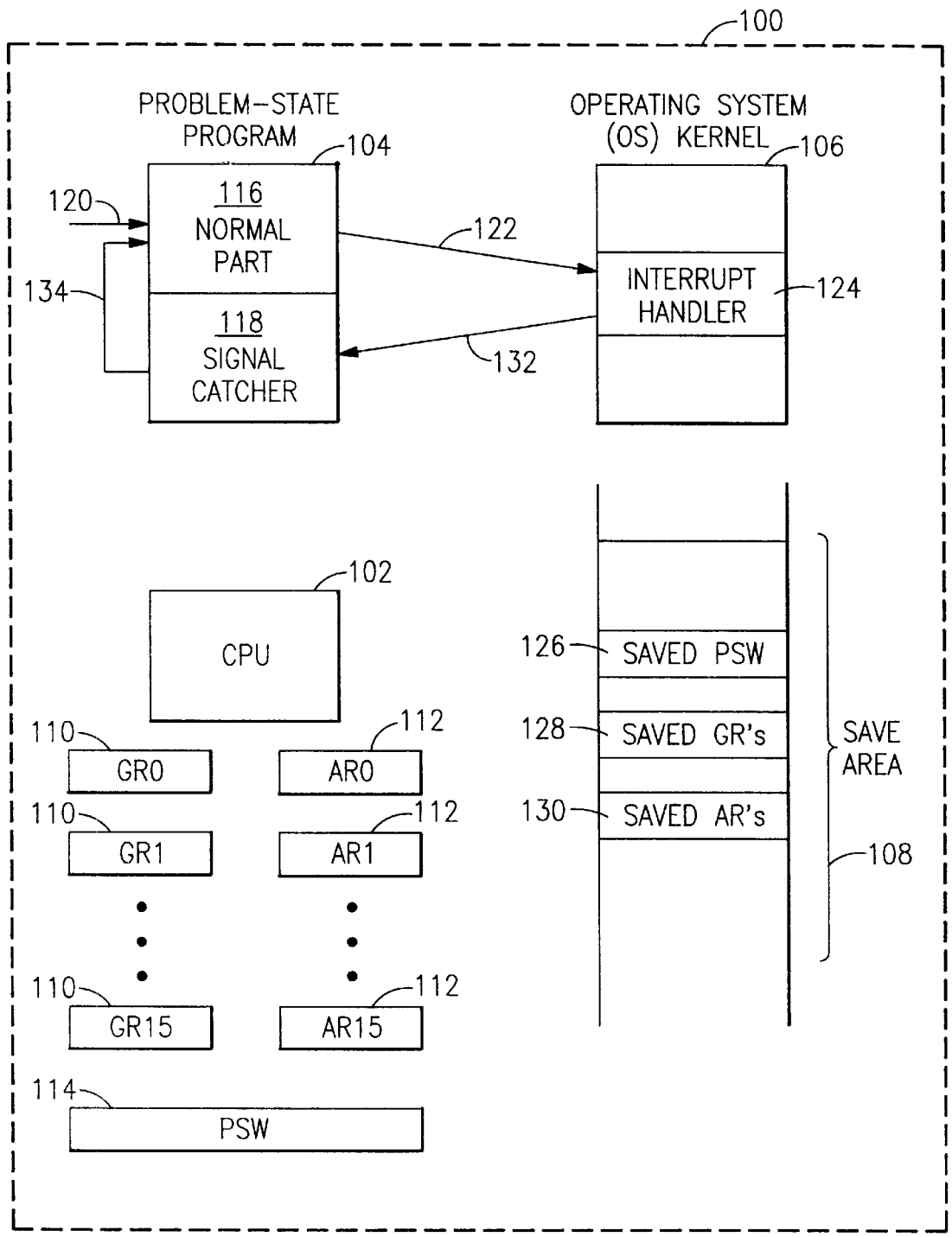
FIG. 1 shows a computer system in which the present invention may be used.

FIG. 1 shows a computer system 100 in which the present invention may be used. As shown in the figure, computer system 100 contains a central processing unit (CPU) 102, at least one user program 104, an operating system (OS) kernel 106, and a save area 108 associated with the user program 104, which has the necessary authorization to access it. Computer system 100 may comprise either a separate physical machine or a separate partition of a logically partitioned machine. Although the invention is not limited to any particular hardware platform, it will be discussed in the exemplary context of an IBM S/390 environment. In such an environment, system 100 may be an IBM S/390 Parallel Enterprise Server, while OS kernel 106 may comprise the IBM OS/390 operating system.

In an S/390 environment, it will be assumed that user program 104 is executing in what is known as the problem state (and is hence referred to as a "problem state program"), while OS kernel 106 operates normally in what is known as the supervisor state. As explained in the S/390 architecture document referred to above, in the supervisor state all instructions are valid, whereas in the problem state only unprivileged instructions and (if certain authority tests are met) semiprivileged instructions are valid.

CPU 102, which constitutes the primary instruction processing unit of system 100, may comprise one or more central processors (CPs) (not separately shown). As is conventional in the art, CPU 102 has an instruction decoder for decoding instructions being executed as well as an execution unit for executing the decoded instructions. These may be implemented by any suitable combination of hardware and microcode in a manner well know in the art. Since the details of their construction and operation form no part of the present invention, they are not separately shown. CPU 102 has an instruction set that (except for the present invention) is generally described in the architecture document referred to above. This instruction set, or architecture, defines how the CPU 102 appears to programming such as user program 104 or OS kernel 106. As noted in the summary portion above, the hardware and microcode implementing the processor architecture, because of their relative immutability, constitute highly "trusted" parts of the system 100, as contrasted with the OS kernel 106 (which is accorded an intermediate level of "trust") or user program 104 (which is accorded the lowest level of "trust").

Associated with CPU 102 are a set of 16 32-bit general registers 110 (GR0–GR15), 16 32-bit access registers 112 (AR0–AR15), and a 64-bit program status word (PSW) 114. General registers 110 are used as base address registers and index registers in address arithmetic and as accumulators in general arithmetic and logical operations. Access registers 112 are used to specify segment table designations used to perform dynamic address translation. PSW 114 stores the address of the next instruction to be executed, along with other pertinent state information, such as a condition code and various settable program modes, as described below. In addition to registers 110 and 112 and PSW 114, CPU 102 has other registers (such as control registers and floating-point registers) that are not relevant to the present invention and are hence not shown.

Problem state program 104 contains a first part 116 that is executed normally and a second part 118 (referred to as a "signal catcher" herein) that is executed in response to an interrupt. More particularly, in response to an asynchronous event at 120 (such as a message or signal from another program), control is transferred at 122 from the problem state program 104 to an interrupt handler 124 of the OS kernel 106 executing in supervisor state. The interruption point at 120 may be arbitrary with respect to the contents of registers 110 and 112 and PSW 114, which cannot be assumed to be any particular value.

In the preferred embodiment, interrupt handler 124 may be a UNIX signal-handling kernel program. Referring also to FIG. 7, upon gaining control, interrupt handler 124 saves the contents of the general registers 110, access registers 112 and portions of PSW 114 (together constituting what will be referred to as the program execution state or program context) as they existed at the point of interrupt in save area 108 (step 702). More particularly, the saved portions of PSW 114 are saved in a saved PSW location 126 of the save area 108, the contents of general registers 110 are saved in a saved GR location 128 of the save area, and the contents of access registers 112 are saved in a saved AR location 130 of the save area. The interrupt handler 124 then transfers control at 132 to the signal catcher routine 118 in the problem state program 104 (step 704).

Upon gaining control, the signal catcher 118 first makes a copy of the passed in save area 108, and then enables recursive signals. That way, each instance of the signal catcher 118 has its own resume save area 108. Thus, signal catcher 118 can be interrupted by a signal, which can be interrupted by another signal, and so on, in a recursive manner as described above.

After this initialization, signal catcher 118 performs its functions (the particulars of which form no part of the present invention) for processing the event that occurred at 120. When signal catcher 118 completes its processing of the interrupt, one of its options is to return at 134 to the point of interruption at 120 to continue normal processing as if an interruption had not occurred.

Figure 8:
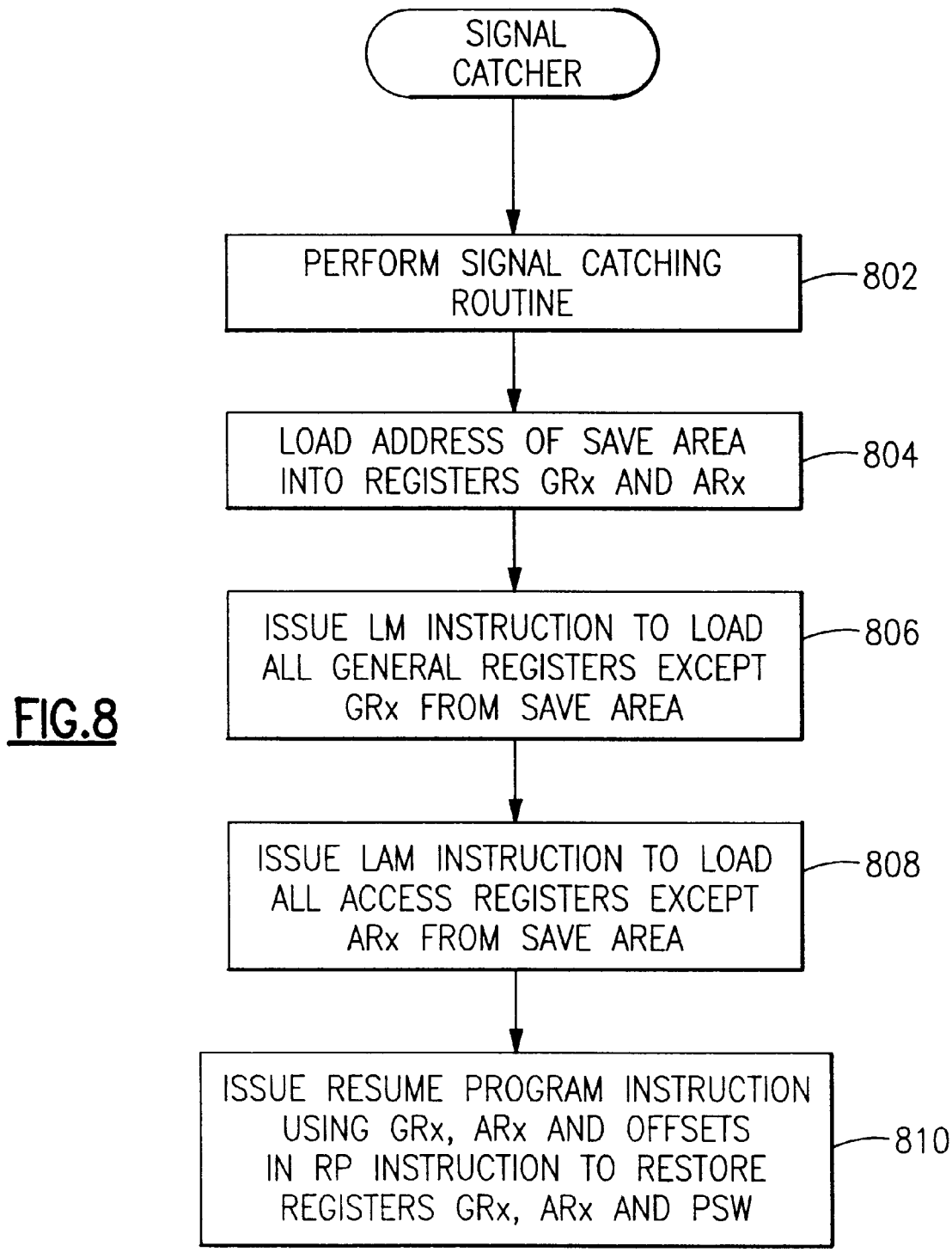
FIG. 8 shows the steps performed by the signal catcher routine that invokes the Resume Program (RP) Instruction.

FIG. 8 shows the steps performed by the signal catcher 118 to return control to the normal part 116 of the program 104 at the point of interruption 120 after the signal catcher has performed its function. Referring to the figure, the signal catcher 118 first loads the address of the save area 108 into a selected general register/access register pair GRx/ARx, where x is an index ranging between 1 and 15 in the embodiment shown (step 802). (In an S/390 environment, x cannot be 0 because GR0 cannot be used for addressing.) Next, the signal catcher 118 restores from the save area 108 all registers 110 and 112 that are not needed by the Resume Program (RP) instruction 300 itself to access the save area. In an S/390 environment, this is done by issuing a Load Multiple (LM) instruction to restore the contents of the set of general registers GRi (where i≠x) from the GR field 128 of the save area 108 (step 804), as well as issuing a Load Access Multiple (LAM) instruction to restore the contents of the set of access registers GRi (where i≠x) from the AR field 130 of the save area 108 (step 806). Although step 804 is shown as preceding step 806 in FIG. 8, the particular order in which the steps are performed is immaterial.

At this point the signal catcher 118 invokes the Resume Program (RP) instruction 300 of the present invention to do full context restoration to the point of the interruption (step 808). The RP instruction 300 uses the content of the general register GRx (and access register ARx, if needed) specified in the instruction to access the save area 108, in the manner described in detail below.

Figure 2A:
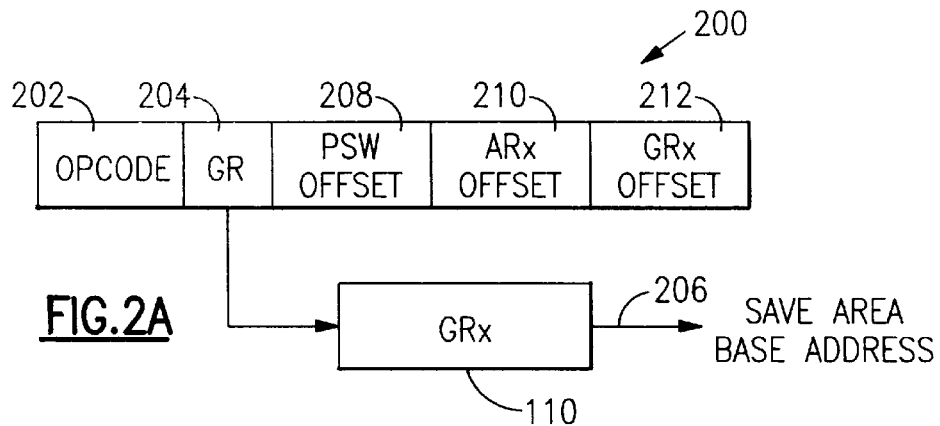
FIG. 2A depicts the format of a general Resume Program instruction of this invention.

FIG. 2A shows the logical format 200 of the Resume Program (RP) instruction of the present invention, which is not specific to any particular platform. In the logical format 200, an operation code (OPCODE) 202 identifies the instruction as an RP instruction; a register specification (GR) 204 specifies a general register 110 (GRx) that contains the base address 206 of the save area 108; a PSW offset 208 specifies the offset of the saved PSW contents 126 from the beginning of the save area 108; an ARx offset 210 specifies the offset of the saved ARx contents from the beginning of the save area 108; and a GRx offset 212 specifies the offset of the saved GRx contents from the beginning of the save area 108.

Figure 2B:
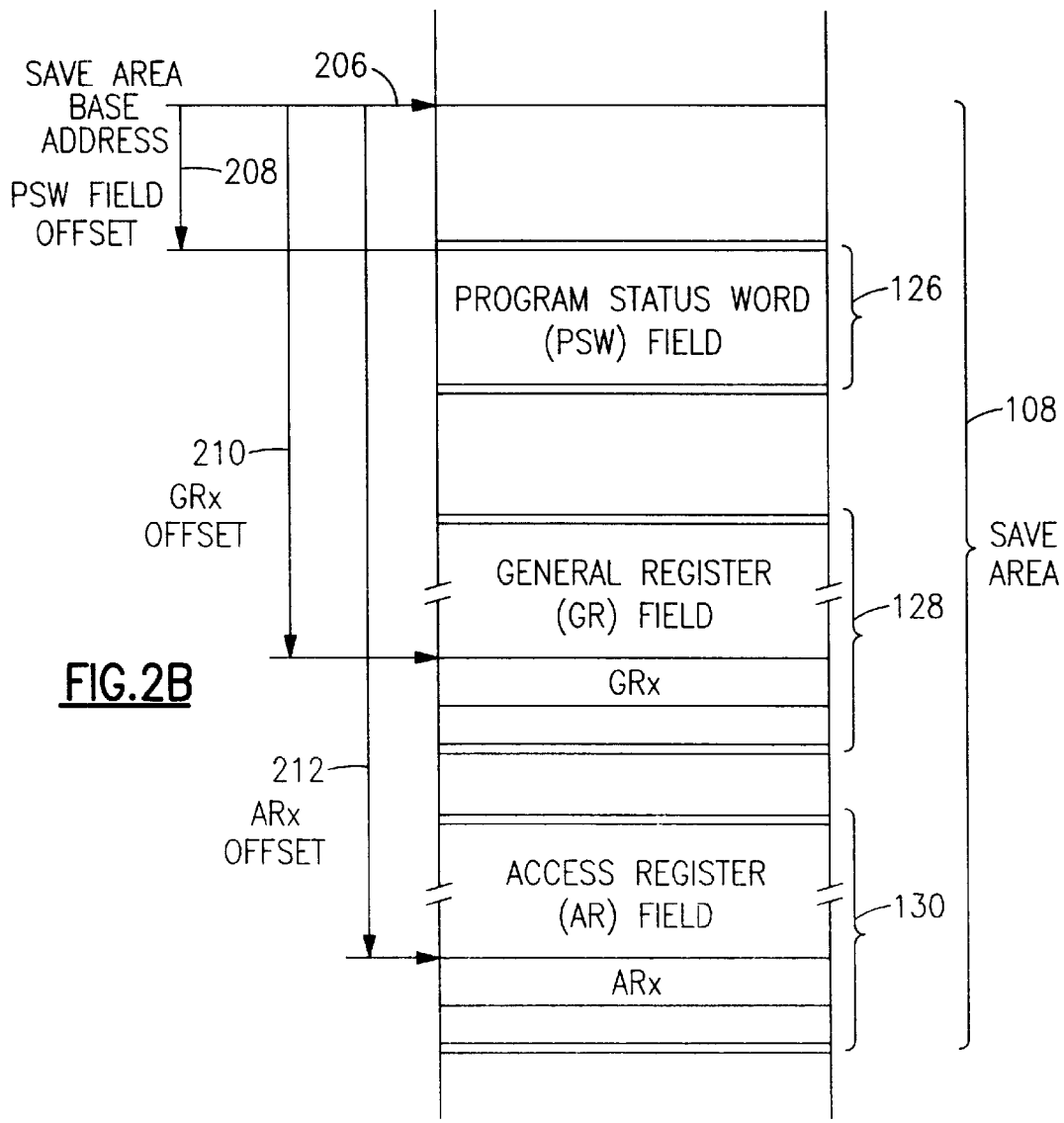
FIG. 2B shows the address arithmetic involved in executing the instruction of FIG. 2A.

FIG. 2B shows graphically the address arithmetic involved in using the operands 204–212. As shown in the figure, to generate the beginning address of the PSW field 126, the PSW offset 208 is added to the base address 206 contained in the general register 110 (GRx) pointed to by the GR field 204. Similarly, to generate the address of the saved GRx contents in field 128, the GRx offset 210 is added to the base address 206 contained in the general register GRx. Finally, to generate the address of the saved ARx contents in field 130, the ARx offset 212 is added to the base address 206 contained in the general register GRx. Although not shown in FIGS. 2A and 2B, the base address 206 contained in general register GRx may be a virtual address that is converted into a real address by dynamic address translation (DAT). In such a case, the corresponding access register ARx may be used to specify a particular address space for which the conversion is performed or to otherwise control the address translation.

Figure 3A:
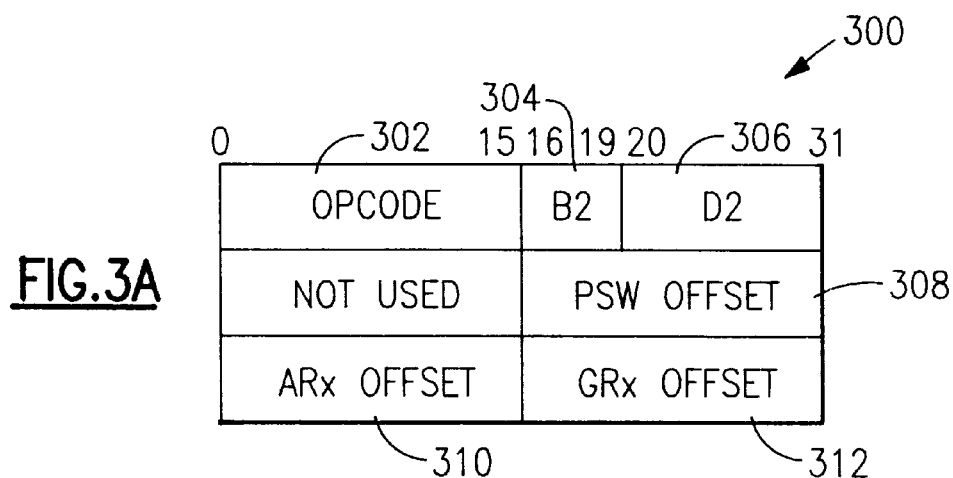
FIG. 3A depicts a Resume Program instruction for an S/390 embodiment described herein.
Figure 3B:
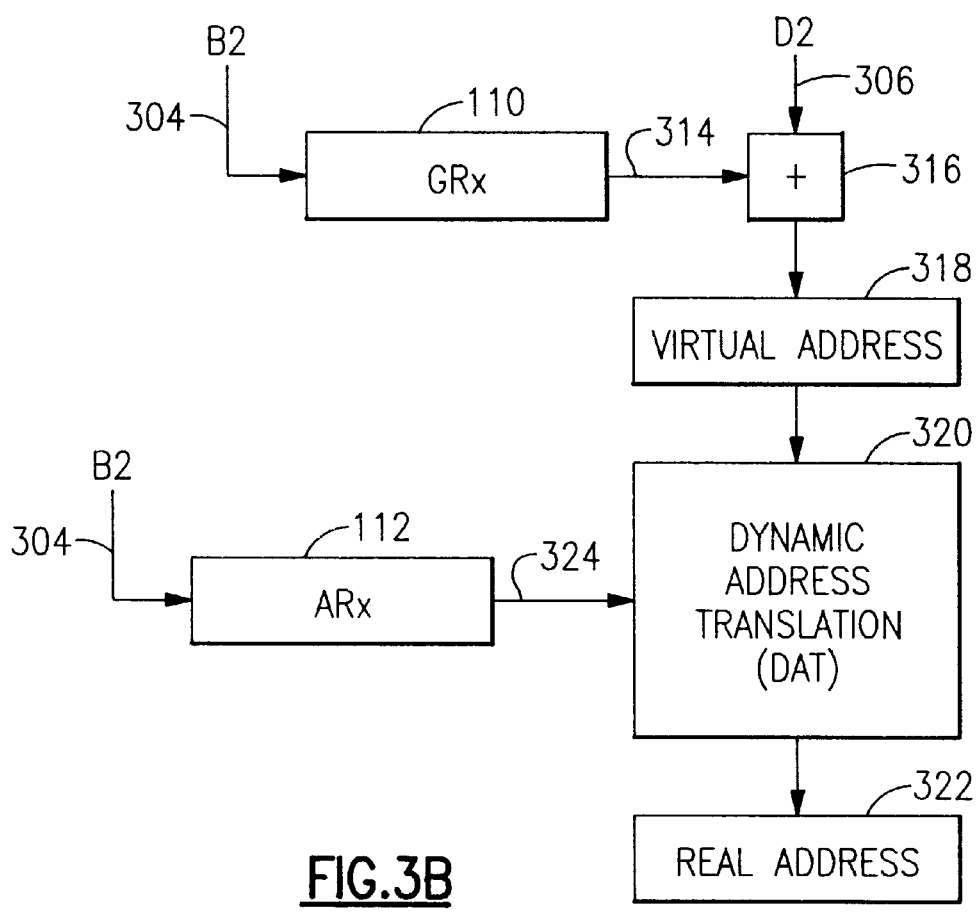
FIG. 3B shows the address arithmetic involved in executing the instruction of FIG. 3A.

FIG. 3A illustrates a possible instruction format 300 for an S/390 environment, while FIG. 3B shows the additional address arithmetic implied by the format. Format 300 comprises a 32-bit instruction proper (bits 0–31), followed immediately by a 64-bit parameter list that for practical purposes may be regarded as part of the instruction. The instruction proper contains a 16-bit opcode field 302, followed by a 4-bit base register field 304 (B2) and a 12-bit displacement field 306 (D2). The 64-bit parameter list contains a 16-bit unused field (filled with zeros), followed by a 16-bit PSW offset 308, a 16-bit ARx offset 310 and a 16-bit GRx offset 312.

Fields 302 and 308–312 are similar to the corresponding fields 202 and 208–212 in logical format 200 and will not be redescribed. Field 304 (B2), like field 204 in logical format 200, specifies a particular general register 110 (GRx) used to point to the save area 108. However, the address contained in the specified register GRx, rather than pointing directly to the beginning address of save area 108, is a base address 314 that is combined at 316 with a displacement D2 specified in field 306 to obtain a beginning address 318 for the save area. As with the address 206, beginning address 318 may be a virtual address that is converted by dynamic address translation (DAT) 320 to a real address 324. As suggested above for the logical format 200, the dynamic address translation 320 may depend on an address space specification determined by an input 324 from the corresponding access register 112 (ARx). The particulars of the dynamic address translation 320 are described in the S/390 architecture document identified above. Except for the fact that the dynamic address translation 320 is determined in part by the contents 324 of the access register ARx, its particulars form no part of the present invention and are hence not discussed in this specification.

As described below, execution of the RP instruction 300 causes certain fields in the current PSW 114 and the contents of the access register 112 (ARx) and general register 110 (GRx) specified by the index in field 304 (B2) to be replaced with fields in the save area 108 (as specified by the second operand address B2, D2) having the specified offsets 308–312.

FIG. 4 shows the format of a conventional S/390 program status word (PSW) 400, as described, for example, in the architecture document referred to above. PSW 400 contains several fields of interest to the present invention, since they are saved in the PSW portion 126 of save area 108 following an interrupt. These fields include an address space control (AS) 402 (bits 16–17); a condition code (CC) 404 (bits 18–19); a program mask 406 (bits 20–23); an addressing mode (A) 408 (bit 32); and an instruction address 410 (bits 33–63). The address space control (AS) 402 specifies, in conjunction with fields in the control registers and control blocks, the instruction address space and the address space containing storage operands. The condition code (CC) 404 is set as a result of certain arithmetic operations and comparisons and can be used to do conditional branching so as to direct program flow based on past results. The program mask 406 specifies, for certain arithmetic results, whether or not those results should cause an interruption, either for terminating program execution or for modifying the results. The addressing mode (A) 408 specifies either a 24-bit or a 31-bit addressing mode. The instruction address 410 is the address of the next instruction to be executed.

PSW 400 contains other fields, which are not restored by the Resume Program instruction of the present invention, since they are not alterable by a program executing in problem state. These include bits 0–15, of which bit 15 is the problem state (P) bit defining whether the CPU 102 is in the problem state (P=1) or in the supervisor state (P=0).

FIG. 5 lists the fields of PSW 400 that are restored by Resume Program from the PSW in the save area used by Resume Program in an S/390 embodiment. As indicated above, the restored fields include the address space control 402, the condition code 404, the program mask 406, the addressing mode 408, and the instruction address 410.

Figure 6:
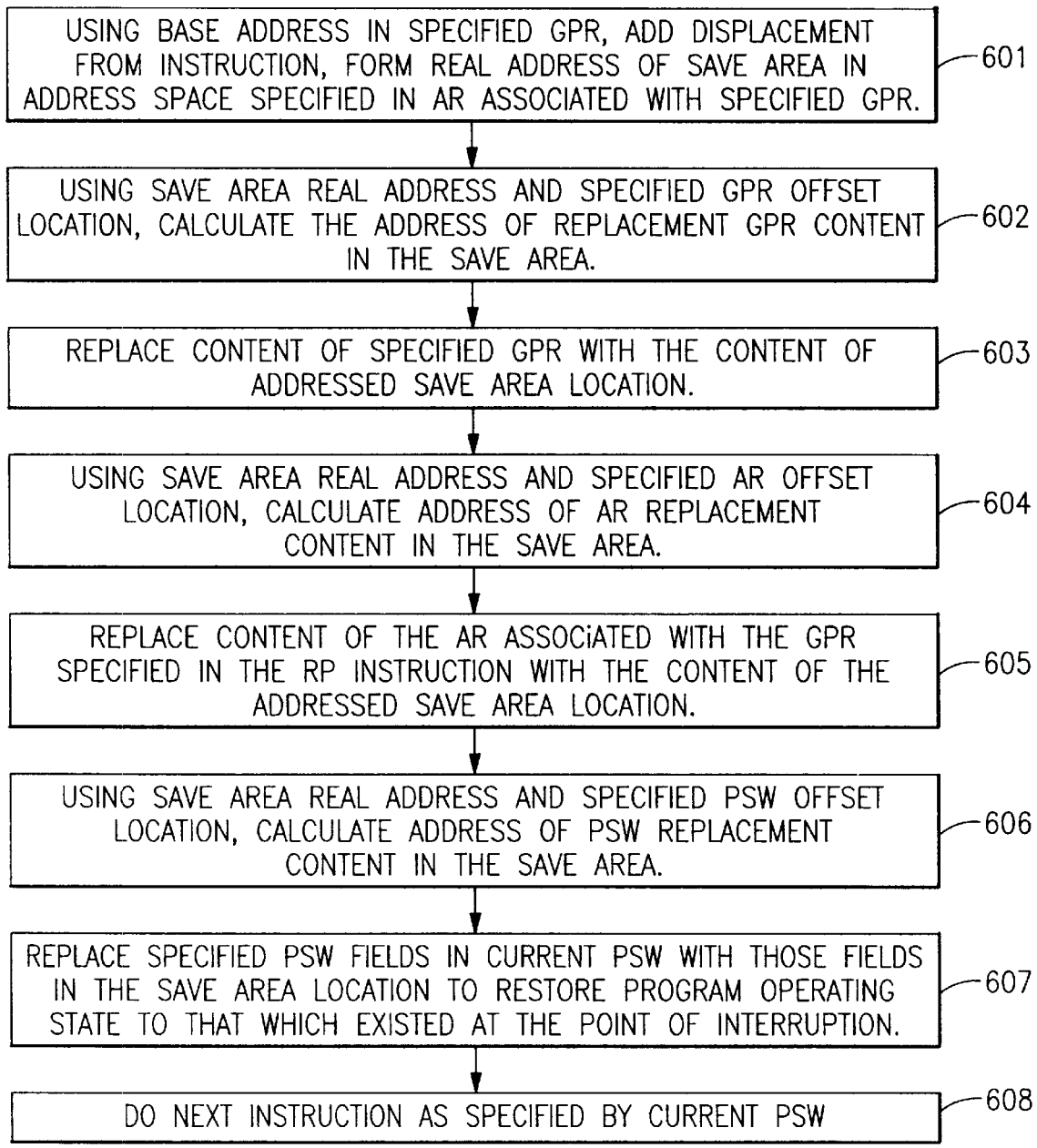
FIG. 6 is a flow chart of the execution of a Resume Program (RP) instruction.

FIG. 6 is a flowchart of the operation of the Resume Program (RP) instruction 300. These actions are performed at the microcode and hardware level of the system 100, within CPU 102; the particulars of their implementation at these levels form no part of the present invention and are hence not shown. Changes to the architected level can not be seen by the program 104 until the RP instruction 300 has completed and control is returned to the program 104 using the PSW 114 as modified by the RP instruction.

Upon decoding an RP instruction, CPU 102 obtains the real address 322 (FIG. 3B) of the save area 108 by forming the effective virtual address 318 and performing normal address translation 320 (step 601).

Next, the address in the save area 108 of the saved value of the general register GRx (specified by the B2 field 304 of the RP instruction) is calculated using the base address 322 of the save area and the GRx offset 312 specified in the instruction parameter list (step 602). This address is then used to replace the content of the general register GRx with the saved content at the addressed save area location (step 603).

The procedure of steps 602–603 is then repeated for the access register ARx associated with the general register GRx. Using the save area real address 322 and the ARx offset 310 specified in the parameter list, the address in the save area 108 of the saved content of the access register ARx is calculated (step 604). The content of the access register ARx is then replaced with the content from the addressed save area location (step 605).

The procedure is then repeated once again to restore the PSW 114. The real address of the PSW 126 in the save area 108 is calculated by using the save area real address 322 and the PSW offset 308 specified in the RP parameter list (step 606). Then, the fields specified for change in the RP instruction definition (FIGS. 4–5) are replaced by the corresponding fields in the stored PSW 126 in the save area 108 (step 607). These fields include the instruction address 410 of the next instruction to be executed in the interrupted part 116 of the program 104; therefore, the RP instruction 300 in effect causes a branch.

Finally, following execution of the RP instruction 300, the next instruction in the interrupted program 104 is executed as specified by the restored PSW 114 (step 608).

As already noted, the RP instruction described above, like other aspects of the CPU architecture, may be implemented by hardware, by microcode, or by any suitable combination of the two, while the signal catcher 118 utilizing the RP instruction is preferable implemented as software. (Both microcode and software constitute programming, the principal difference being that microcode implements an architectural interface while software interacts with it.) While a particular embodiment has been shown and described, those skilled in the art will appreciate that various modifications may be made without departing from the principles of the invention.

What is claimed is:

1. In an information handling system in which execution of a program of instructions by a processor is controlled by a program status word defining a program context, said program executing in either a problem state having relatively restricted authority or a supervisor state having relatively unrestricted authority, said program status word containing a first set of fields that are alterable by a program executing in said problem state and a second set of fields that are not alterable by a program executing in said problem state, a method of operating said processor to restore a previously saved program context, comprising the steps of:

decoding an instruction from a program executing in said problem state specifying a storage location containing a saved program status word; and in response to decoding said program instruction, restoring from the saved program status word contained at said specified storage location only those fields of the current program status word that are alterable by a program executing in said problem state.

2. The method of claim 1 in which said program instruction contains a field specifying a register, said restoring step comprising the step of:

determining said storage location using the contents of the register specified by said field.

3. The method of claim 2 in which said field is a first field, said program instruction containing a second field specifying a displacement from a base address, said restoring step comprising the step of:

determining said storage location by using the contents of the register specified by said first field as a base address and adding to said base address the displacement contained in said second field.

4. The method of claim 2 in which said register specifies a save area containing said storage location and saved contents of said register, said restoring step comprising the further step of:

restoring said saved register contents to said register from said save area.

5. The method of claim 1 in which said program instruction specifies a beginning address of a save area and an offset from said beginning address, said restoring step comprising the step of:

determining said storage location by adding the offset specified by said program instruction to the beginning address of the save area specified by said program instruction.

6. The method of claim 1 in which said saved program status word contains an instruction address that is restored by said restoring step to cause execution to resume at said instruction address.

7. In an information handling system in which execution of a program of instructions by a processor is controlled by a program status word and by a set of registers defining a program context, said program status word containing an instruction address, a method of operating said processor to restore a previously saved program context, comprising the steps of:

decoding a program instruction specifying a register selected from said set of registers, said register pointing to a save area containing a saved program status word and saved register contents, and in response to decoding said program instruction:
        accessing said save area using the contents of the register specified by said program instruction; and
        restoring said program status word and said register from the saved program status word and saved register contents contained in said save area to resume execution at the instruction address contained in said saved program status word with the program context defined by said saved program status word and saved register contents.

8. The method of claim 7 in which said program instruction specifies a general register.

9. The method of claim 7 in which said program instruction specifies a general register and an access register, said accessing step using the contents of said general register and said access register to access said save area.

10. The method of claim 7 in which the specified register specifies a base address, said program instruction also specifying a displacement from said base address, said accessing step comprising the step of:

adding the specified displacement to the base address contained in said specified register.

11. The method of claim 7 in which said register specifies a beginning address of said save area, said program instruction also specifying an offset from said beginning address, said accessing step comprising the step of:

adding the offset specified by said program instruction to the beginning address of the save area specified by said register.

12. The method of claim 7 in which said program executes in either a problem state having relatively restricted authority or a supervisor state having relatively unrestricted authority, said restoring step being performed for a program executing in said problem state and restoring only those fields of the current program status word that are alterable by a program executing in said problem state.

13. In an information handling system in which execution of a program of instructions by a processor is controlled by a program status word and by a set of registers defining a program context, said program status word containing an instruction address, a method of restoring a previously saved program status word and saved register contents defining a previous program context, comprising the steps of:

loading the address of a save area containing said previously saved program context into a specified one of said registers;

restoring the contents of said registers other than said specified register from said save area using a first instruction; and restoring the contents of said program status word and said specified register from said save area using a second instruction to resume execution at the instruction address contained in said saved program status word with the program context defined by said saved program status word and saved register contents.

14. In an information handling system in which execution of a program of instructions by a processor is controlled by a program status word defining a program context, said program executing in either a problem state having relatively restricted authority or a supervisor state having relatively unrestricted authority, said program status word containing a first set of fields that are alterable by a program executing in said problem state and a second set of fields that are not alterable by a program executing in said problem state, apparatus for operating said processor to restore a previously saved program context, comprising:

means for decoding an instruction from a program executing in said problem state specifying a storage location containing a saved program status word; and means responsive to said decoding means for restoring from the saved program status word contained at said specified storage location only those fields of the current program status word that are alterable by a program executing in said problem state.

15. The apparatus of claim 14 in which said program instruction contains a field specifying a register, said restoring means comprising:

means for determining said storage location using the contents of the register specified by said field.

16. The apparatus of claim 15 in which said field is a first field, said program instruction containing a second field specifying a displacement from a base address, said restoring means comprising:

means for determining said storage location by using the contents of the register specified by said first field as a base address and adding to said base address the displacement contained in said second field.

17. The apparatus of claim 15 in which said register specifies a save area containing said storage location and saved contents of said register, said restoring means further comprising:

means for restoring said saved register contents to said register from said save area.

18. The apparatus of claim 14 in which said program instruction specifies a beginning address of a save area and an offset from said beginning address, said restoring means comprising:

means for determining said storage location by adding the offset specified by said program instruction to the beginning address of the save area specified by said program instruction.

19. In an information handling system in which execution of a program of instructions by a processor is controlled by a program status word and by a set of registers defining a program context, said program status word containing an instruction address, apparatus for operating said processor to restore a previously saved program context, comprising:

means for decoding a program instruction specifying a register selected from said set of registers, said register pointing to a save area containing a saved program status word and saved register contents, and means response to said decoding means for executing said instruction, said executing means comprising:

means for accessing said save area using the contents of the register specified by said program instruction; and means for restoring said program status word and said register from the saved program status word and saved register contents contained in said save area to resume execution at the instruction address contained in said saved program status word with the program context defined by said saved program status word and saved register contents.

20. The apparatus of claim 19 in which the specified register specifies a base address, said program instruction also specifying a displacement from said base address, said accessing means comprising:

means for adding the specified displacement to the base address contained in said specified register.

21. The apparatus of claim 19 in which said register specifies a beginning address of said save area, said program instruction also specifying an offset from said beginning address, said accessing means comprising:

means for adding the offset specified by said program instruction to the beginning address of the save area specified by said register.

22. The apparatus of claim 19 in which said program executes in either a problem state having relatively restricted authority or a supervisor state having relatively unrestricted authority, said restoring means being operative for a program executing in said problem state and restoring only those fields of the current program status word that are alterable by a program executing in said problem state.

23. In an information handling system in which execution of a program of instructions by a processor is controlled by a program status word and by a set of registers defining a program context, said program status word containing an instruction address, apparatus for restoring a previously saved program status word and saved register contents defining a previous program context, comprising:

means for loading the address of a save area containing said previously saved program context into a specified one of said registers;

means for restoring the contents of said registers other than said specified register from said save area using a first instruction; and means for restoring the contents of said program status word and said specified register from said save area using a second instruction to resume execution at the instruction address contained in said saved program status word with the program context defined by said saved program status word and saved register contents.

* * * * *